July 30, 1957  M. E. PIPER  2,801,113
STEERABLE VEHICLE WHEEL SUSPENSION MEANS
Filed Oct. 11, 1954
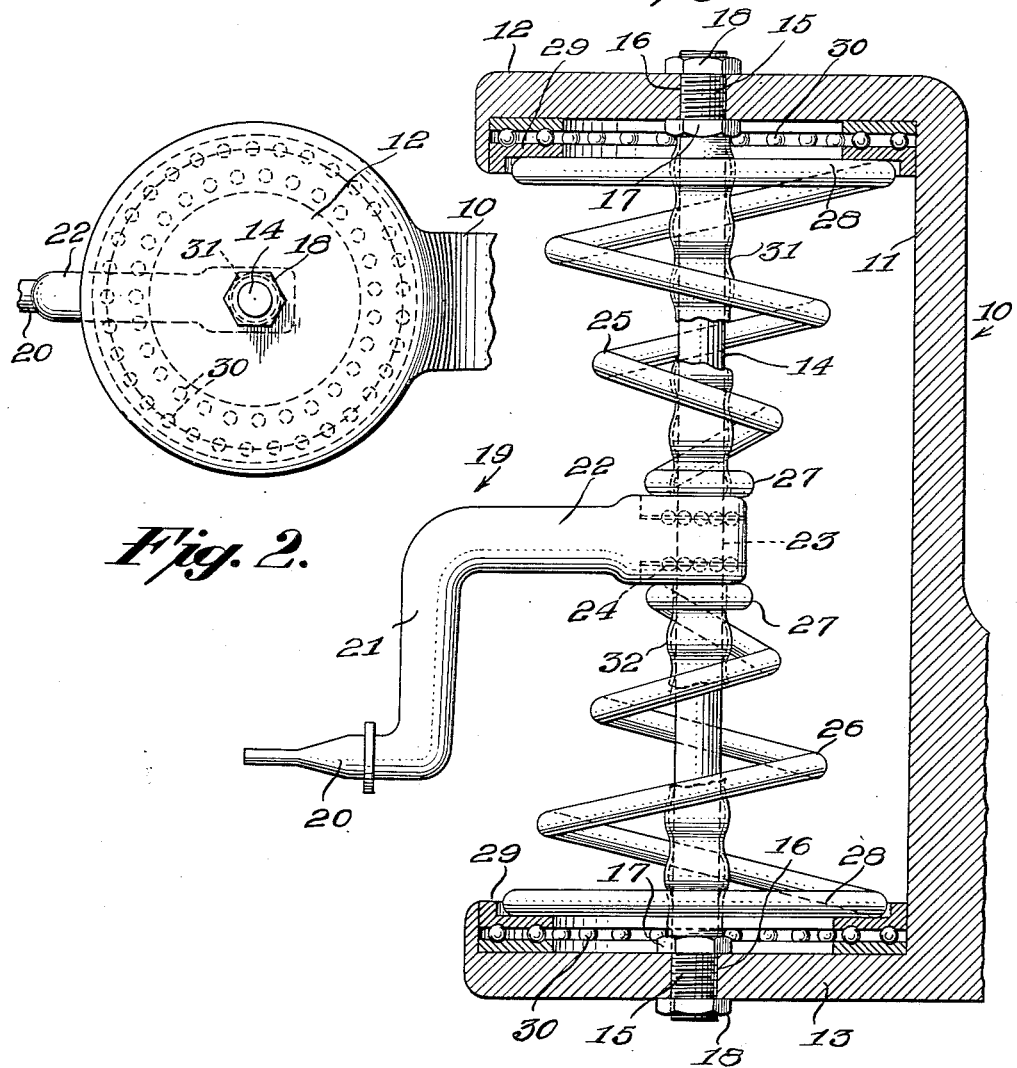
INVENTOR
*Melvin E. Piper*
BY *Merle C. Kissinger*
ATTORNEY

United States Patent Office 2,801,113
Patented July 30, 1957

2,801,113
STEERABLE VEHICLE WHEEL SUSPENSION MEANS

Melvin E. Piper, Altoona, Pa.

Application October 11, 1954, Serial No. 461,517

1 Claim. (Cl. 280—96.2)

This invention relates to a steerable vehicle wheel suspension means.

The invention is more particularly concerned with a yieldable suspension means for the front steerable wheels of motor vehicles and a primary object of the invention is to provide a wheel suspension means which is of marked structural simplicity while being highly sensitive to road irregularities in operation.

A further object of the invention is to provide a wheel suspension means which generally comprises a wheel supporting spindle mounted for rotation about and for movement along an axis perpendicular to a vehicle axle and wherein the said spindle is subjected to yieldable pressure on each side thereof in the direction of the said axis.

Other objects and advantages of the invention will become apparent in the course of the following detailed description, taken in connection with the accompanying drawing, wherein—

Fig. 1 is a vertical sectional view with shaft supported elements shown in elevation.

Fig. 2 is a broken top plan view on a reduced scale.

Referring now in detail to the drawing, 10 designates a main support or an end of a front vehicle axle.

The said support comprises a vertical portion 11 and upper and lower circular bearing supporting portions 12 and 13 respectively.

Disposed axially of the portions 12 and 13 is a vertical shaft 14 having opposite threaded ends 15 which project through apertures 16 centrally of the portions 12 and 13 and inner and outer nuts 17 and 18 disposed on said threaded ends engage the inner and outer faces of portions 12 and 13 for retaining the shaft 14 rigid relative to the bearing supporting portions 12 and 13.

A wheel supporting spindle 19 is provided with a wheel engaging portion 20 normal to the shaft 14, a portion 21 parallel with the shaft and a portion 22 normal to the shaft and disposed above portion 20 in generally parallel relation thereto.

The portion or arm 22 is provided with a vertical aperture 23 in which the shaft 14 is freely disposed.

The said portion or arm 22 is provided with ball bearings 24 for easy rotation of the arm 22 about the shaft as well as for movement axially thereof.

The spindle 19 is of course provided with suitable steering connections.

The said arm 22 is normally maintained substantially centrally of the bearing supporting portions 12 and 13 by an upper coil spring 25 and a lower coil spring 26.

The springs 25 and 26 are of frusto-conical form in elevation and have their smaller ends 27 engaged with vertically opposed faces of arm 22 and their larger ends 28 are engaged within seats 29 of ball bearing assemblies 30.

Upper and lower flexible and generally cylindrical boots 31 and 32 surround the shaft 14 and have their opposite ends engaged with arm 22 and the inner nuts 17 and which boots function to retain grease and protect the shaft 14 against the accumulation of dirt.

From the above, it will be seen that the shaft 14 is rigid with the axle 10 and the wheel supporting spindle 19 together with the springs 25 and 26 is rotatable about the axis of the shaft while at the same time being yieldably movable axially of the shaft in the absorption of impacts due to road bed irregularities.

It is to be particularly observed that the frusto-conical form of the springs 25 and 26 provides for a nesting of the convolutions thereof in the compression of the springs whereby the arm 22 is capable of a substantial movement axially of the shaft 14 for the realization of the sensitivity referred to.

The device will be seen to comprise relatively few structural elements while possessing the capacity for operation as a highly efficient knee action wheel suspension means.

While I have disclosed my invention in accordance with a single specific structural embodiment thereof, such is to be considered as illustrative only, and not restrictive, the scope of the invention being defined in the sub-joined claim.

What I claim and desire to secure by U. S. Letters Patent is:

A wheel suspension device of the character disclosed, comprising in operative association with an end of a rigid axle, upper and lower parallel circular bearing supporting portions rigid with the axle, a shaft disposed axially of said bearing supporting portions and rigidly secured thereto, a wheel supporting spindle mounted on said shaft intermediate said bearing supporting portions for movement axially of the shaft and for rotation about same, a ball bearing assembly supported by each of said supporting portions and each of said assemblies comprising an inwardly facing seat, and a frusto-conical spring disposed on each side of said spindle in surrounding relation to said shaft, said springs being disposed with their smaller ends seated on vertically opposite sides of said spindle and with their larger ends disposed in said bearing seats, said spindle comprising a wheel supporting portion normal to said shaft, a portion parallel with said shaft, and a portion normal to said last-named portion and said shaft and on whose opposite sides the adjacent smaller ends of said springs are seated, and said last portion being provided with shaft engaging ball bearings.

References Cited in the file of this patent

UNITED STATES PATENTS

| 380,651 | Fowler | Apr. 3, 1888 |
| 1,118,761 | Griffith | Nov. 24, 1914 |
| 2,299,241 | Kumm | Oct. 20, 1942 |
| 2,299,926 | Phelps | Oct. 27, 1942 |